US011808910B2

(12) United States Patent
Alvarez

(10) Patent No.: US 11,808,910 B2
(45) Date of Patent: Nov. 7, 2023

(54) METHOD AND APPARATUS FOR LOOKING AHEAD OF THE DRILL BIT

(71) Applicant: SAUDI ARABIAN OIL COMPANY, Dhahran (SA)

(72) Inventor: Jose Oliverio Alvarez, Houston, TX (US)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 148 days.

(21) Appl. No.: 17/443,619

(22) Filed: Jul. 27, 2021

(65) Prior Publication Data

US 2022/0035064 A1 Feb. 3, 2022

Related U.S. Application Data

(60) Provisional application No. 63/057,734, filed on Jul. 28, 2020.

(51) Int. Cl.
*E21B 47/13* (2012.01)
*G01V 3/30* (2006.01)
*E21B 47/002* (2012.01)
*G01V 3/38* (2006.01)

(52) U.S. Cl.
CPC ............ *G01V 3/30* (2013.01); *E21B 47/0025* (2020.05); *E21B 47/13* (2020.05); *G01V 3/38* (2013.01)

(58) Field of Classification Search
CPC ........ G01V 3/30; G01V 3/38; E21B 47/0025; E21B 47/13
See application file for complete search history.

(56) References Cited

U.S. PATENT DOCUMENTS

| 2,455,941 | A | 12/1948 | Muskat et al. |
| 3,412,815 | A | 11/1968 | Holser et al. |
| 4,383,220 | A | 5/1983 | Baldwin |
| 7,013,991 | B2 | 3/2006 | Wilson-Langman et al. |
| 8,847,600 | B2 | 9/2014 | Signorelli et al. |
| 9,250,347 | B2 | 2/2016 | Coman |

(Continued)

OTHER PUBLICATIONS

International Search Report and Written Opinion for International Application No. PCT/US2021/071031 (SA51482), report dated Nov. 26, 2021; pp. 1-15.
Scattone, F. et al.; "Design of Dual Polarised Wide Band Plane Wave Generator for Direct Far-Field Testing" 13th European Conference on Antennas and Propagation (EuCAP 2019), Mar. 31, 2019; pp. 1-4.

(Continued)

*Primary Examiner* — Alesa Allgood
(74) *Attorney, Agent, or Firm* — Bracewell LLP; Constance G. Rhebergen; Keith R. Derrington

(57) ABSTRACT

A system for looking ahead of a drill bit includes a plane wave generator (PWG) tool deployed downhole inside a wellbore for formation evaluation and generation of reflection data, a power source providing electric power to the PWG tool for the formation evaluation and the generation of the reflection data, a surface control system receiving the reflection data from the PWG tool and generating image data of a subsurface rock formation based on the received reflection data, and a wireline that electrically couples the PWG tool to the power source and communicatively couples the PWG tool to the surface control system. The PWG tool includes a beam forming network (BFN) architecture and a plurality of antenna elements mounted to a base of the PWG tool to transmit and receive electromagnetic signals.

21 Claims, 7 Drawing Sheets

(56) References Cited

U.S. PATENT DOCUMENTS

| | | | |
|---|---|---|---|
| 10,061,049 B2 | 8/2018 | Arsalan et al. | |
| 10,344,533 B2 | 7/2019 | Dashevsky et al. | |
| 10,914,159 B2* | 2/2021 | Roberson | E21B 47/12 |
| 2005/0189947 A1* | 9/2005 | Haugland | G01V 3/30 |
| | | | 324/338 |
| 2010/0102986 A1* | 4/2010 | Benischek | E21B 47/125 |
| | | | 340/855.8 |
| 2010/0253587 A1* | 10/2010 | Lindenmeier | H01Q 21/29 |
| | | | 343/858 |
| 2010/0307741 A1* | 12/2010 | Mosse | G01V 3/30 |
| | | | 703/2 |
| 2016/0370491 A1 | 12/2016 | Fechine et al. | |
| 2017/0234122 A1 | 8/2017 | Moelders et al. | |
| 2017/0271781 A1* | 9/2017 | Gururaja Rao | H01Q 3/36 |
| 2017/0350243 A1 | 12/2017 | Pillai | |
| 2019/0032484 A1 | 1/2019 | Perkins et al. | |

OTHER PUBLICATIONS

Bucci O. M. et al. "Plane-Wave Generators: Design Guidelines, Achievable Performances and Effective Synthesis", IEEE Transactions on Antenna Propagation, vol. 61, No. 4., Apr. 2013, pp. 2005-2018.

Daniels D., "Ground Penetrating Radar", 1st Edition, IET, London, 2007, 1 page.

Scattone F. et al., "Comparative Testing of Devices in a Spherical Near Field System and Plane Wave Generator", Proceedings of the 41th Antenna Measurement and Technique Association, 2019, 3 pages.

Scattone F., et al. "Plane Wave Generator for Direct Far-field Over-The-Air Testing of Devices", Proceedings of the 40th Antenna Measurement and Technique Association, 2018, pp. 121-126.

* cited by examiner

METHOD AND APPARATUS FOR LOOKING AHEAD OF THE DRILL BIT

TECHNICAL FIELD

Embodiments of the invention generally relate to preventing lost circulation problems in a wellbore during drilling operations. More specifically, embodiments of the invention relate to "looking ahead" of the drill bit using a plane wave generator array to detect upcoming zones or formations where the probability of drilling hazards like lost circulation is higher than normal.

BACKGROUND

A rock formation that resides under the Earth's surface is often referred to as a "subsurface" formation. A subsurface formation that contains a subsurface pool of hydrocarbons, such as oil and gas, is often referred to as a "hydrocarbon reservoir." Hydrocarbons are typically extracted (or "produced") from a hydrocarbon reservoir by way of a hydrocarbon well. A hydrocarbon well normally includes a wellbore (or "borehole") that is drilled into the reservoir. For example, a hydrocarbon well may include a wellbore that extends into the rock of a reservoir to facilitate the extraction (or "production") of hydrocarbons from the reservoir, the injection of fluids into the reservoir, or the evaluation and monitoring of the reservoir.

Lost circulation is one of the frequent challenges encountered during drilling operations. Lost circulation, which can be encountered during any stage of operations, may occur when drilling fluid (or drilling mud) pumped into a well returns partially or does not return at all to the surface. While some fluid loss is expected, fluid loss beyond acceptable norms is not desirable from a technical, an economical, or an environmental point of view. About 75% of the wells drilled per year encounter lost circulation problems to some extent. In extreme cases, lost circulation problems may force abandonment of a well undergoing drilling. Lost circulation may occur while drilling reservoir sections or non-reservoir sections of the wellbore due to the drill bit encountering formations with high permeability (i.e., lost circulation zones) such as super-K formations, fractured formations with varying fracture sizes and fracture densities, interconnected or individual vugular (vuggy) zones or formations, cavernous zones or formations, karsted zones, and other faulted characteristics of the carbonate rock formations having high permeability that causes fluid loss by preventing return of the fluid to surface.

To prevent or minimize loss of drilling fluid during the drilling operations, it is desirable to quickly detect or even avoid the potential lost circulation zones before the drill bit reaches or drills deep into such zones. Armed with the knowledge of the upcoming geological subsurface rock formations that the drill bit is about to drill into (i.e., what lies ahead), the operator may be able to take necessary preventative steps (e.g., inject lost circulation materials (LCMs) to combat lost circulation) to minimize or avoid lost circulation problems, and accurately determine safety of continued drilling into the formations.

Conventional techniques to "look ahead" of the drill bit have included use of inclined loop antennas disposed in the bottomhole assembly (BHA) or use of geosteering techniques. However, such conventional techniques only enable visualization of subsurface formations at lateral sides of the drill bit. An improved visualization apparatus that is compact enough for being deployed quickly and easily into the borehole, and that can enable the drilling operator to image the region directly underneath the drill bit with beam directivity and high penetration depth of the imaged region is desirable.

SUMMARY

The following presents a simplified summary of the disclosed subject matter in order to provide a basic understanding of some aspects of the subject matter disclosed herein. This summary is not an exhaustive overview of the technology disclosed herein. It is not intended to identify key or critical elements of the disclosed subject matter or to delineate the scope of the disclosed subject matter. Its sole purpose is to present some concepts in a simplified form as a prelude to the more detailed description that is discussed later.

In one embodiment, a system for looking ahead of a drill bit includes: a plane wave generator (PWG) tool configured for being deployed downhole inside a wellbore for formation evaluation and generation of reflection data; a power source configured to provide electric power to the PWG tool for the formation evaluation and the generation of the reflection data; a surface control system configured to receive the reflection data from the PWG tool and generate image data of a subsurface rock formation based on the received reflection data; and a wireline that electrically couples the PWG tool to the power source and that communicatively couples the PWG tool to the surface control system; wherein the PWG tool includes a beam forming network (BFN) architecture and a plurality of antenna elements mounted to a base of the PWG tool and configured to transmit and receive electromagnetic signals.

In another embodiment, a plane wave generator (PWG) tool for looking ahead of a drill bit includes: a casing that is adapted to be suspended downhole inside a wellbore from an uphole side of the casing by a wireline configured to supply electric power to the PWG tool and to transmit reflection data generated by the PWG tool to a surface control system; a PWG system housed in the casing, wherein the PWG system includes a beam forming network (BFN) architecture and a plurality of antenna elements mounted to a base of the PWG system so that the plurality of antenna elements mounted to the base are exposed on a downhole side of the casing that is opposite to the uphole side, wherein the base is a cylindrical base and a space between the plurality of antenna elements on the base is filled with microwave absorbent material, wherein the plurality of antenna elements are mounted to the cylindrical base as a circular array of a plurality of concentric rings of antenna elements, each of the plurality of concentric rings including at least one of the plurality of antenna elements, and wherein the BFN architecture is configured to individually control relative amplitude and phase weights between the plurality of concentric rings of antenna elements, while exciting each antenna element within the same concentric ring with the same amplitude and phase.

In yet another embodiment, a method for looking ahead of a drill bit includes: pulling a drill bit and a drill string out of a borehole in response to determining a need to look ahead of the drill bit during a drilling operation; lowering a wireline based plane wave generator (PWG) tool downhole into the borehole such that a bottom surface of the PWG tool is positioned at a predetermined height above a bottomhole surface of the borehole, wherein the PWG tool includes a plurality of antenna elements that are mounted to the bottom surface of the PWG tool and that are configured to transmit and receive electromagnetic signals; transmitting electric power from a surface based power source to the plurality of antenna elements of the PWG tool via the wireline; emitting electromagnetic signals from the plurality of radiating elements in response to the transmitted electric power such that the emitted electromagnetic signals: (i) are synthesized into plane waves in a quiet zone having a finite volume and being in close proximity to the plurality of antenna elements, and (ii) penetrate a subsurface rock formation beyond the bottomhole surface of the borehole as the plane waves; receiving, with the plurality of antenna elements and in response to the emitted electromagnetic signals, reflections of the transmitted plane waves from the subsurface rock formation in the quiet zone to capture reflection coefficients in frequency or time domain of different media of the subsurface rock formation in the quiet zone; generating reflection data based on the received reflections of the transmitted plane waves, wherein the reflection data indicates a contrast in electromagnetic properties at an interface between two different media of the subsurface rock formation in the quiet zone; transmitting the reflection data to the surface control system via the wireline; and processing, at the surface control system, the reflection data for permittivity prediction and generation of image data, wherein a lost circulation zone in the quiet zone is detected based on the generated image data.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

Figure 1:
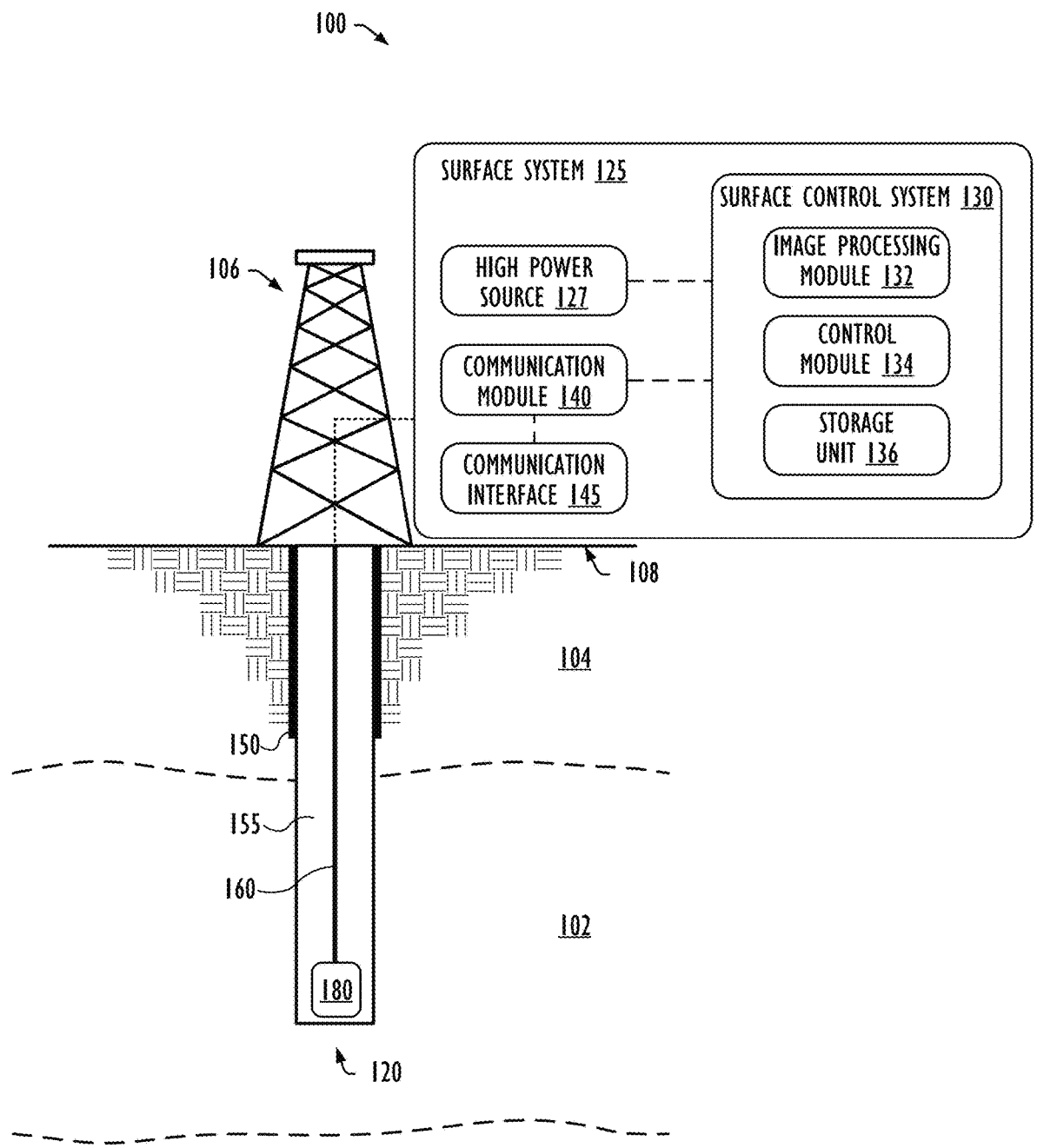
FIG. 1 is a schematic diagram of a well environment during a drilling stage in accordance with one or more embodiments.

While certain embodiments will be described in connection with the illustrative embodiments shown herein, the subject matter of the present disclosure is not limited to those embodiments. On the contrary, all alternatives, modifications, and equivalents are included within the spirit and scope of the disclosed subject matter as defined by the claims. In the drawings, which are not to scale, the same reference numerals are used throughout the description and in the drawing figures for components and elements having the same structure.

DETAILED DESCRIPTION

In the following description, for purposes of explanation, numerous specific details are set forth in order to provide a thorough understanding of the inventive concept. In the interest of clarity, not all features of an actual implementation are described. Moreover, the language used in this disclosure has been principally selected for readability and instructional purposes, and may not have been selected to delineate or circumscribe the inventive subject matter, resort to the claims being necessary to determine such inventive subject matter. Reference in this disclosure to "one embodiment" or to "an embodiment" or "another embodiment" means that a particular feature, structure, or characteristic described in connection with the embodiment is included in at least one embodiment of the disclosed subject matter, and multiple references to "one embodiment" or "an embodiment" or "another embodiment" should not be understood as necessarily all referring to the same embodiment.

This disclosure pertains to a downhole wireline tool that utilizes an electromagnetic plane wave generator (PWG) array to "look ahead" of the drill bit in the borehole by generating image data of the geological rock formation beyond the bottom surface of the wellbore using plane waves. The drilling operator may evaluate the geological formation directly underneath the drill bit and beyond the bottom surface of the borehole based on the generated image data. The image data may thus enable the drilling operator to prevent or minimize lost circulation problems when drilling in situations where the probability of drilling hazards like lost circulation zones is higher than normal. Lost circulation zones may include highly fractured zones, vuggy formations, caverned formations, and the like. Conventional systems like inclined loop antennas or geosteering techniques to look ahead of the drill bit do not produce the beam directivity and penetration depth advantages produced by the system of the present disclosure that utilizes a PWG array and a surface based high-power source to generate microwaves that penetrate the rock formation beyond and directly underneath the bottomhole as plane waves, wherein the plane waves are reflected by the successive interfaces between layers of the rock formation with varying electromagnetic properties, and the reflected waves being received by the PWG array as reflection data that can be converted into image data for formation evaluation.

A bottom surface of the PWG tool may be mounted with an array of radiating elements (e.g., antenna elements, array elements and the like, made of metal such as copper or aluminum) generating an approximately plane wave over a finite volume called a quiet zone at a very short distance from the PWG array and extending inside the geological formation directly underneath the PWG tool. The space between the array elements may be filled with microwave absorbent material that can handle high downhole temperatures and pressures. Contrary to conventional techniques, the plane wave condition according to the present disclosure can be achieved at a very short distance from the emitting PWG array of radiating elements, and allows for longer penetration into the rock and easier wave inversion to obtain rock properties, which is then shown via output as an image. Specific configuration of the array (e.g., size or shape of the individual array elements, size or shape of the PWG array base on which the elements are mounted, arrangement of the elements on the base, and the like) and the power applied thereto via the wireline can be optimized based on the borehole diameter and other downhole operation limitations to achieve the desired plane wave amplitude and frequency characteristics. Given the shape of the borehole (e.g., circular), the array of antenna elements may be circular, made of several concentric rings of radiating elements and disposed on a cylindrical base of absorbent material.

During operation, in response to the operator determining the need to look ahead of the drill bit (e.g., due to sudden loss or decline of circulation fluid, change in drilling operation parameters or sensor data, and the like), after pulling the drill string out of the bore hole, the operator may lower into the borehole, the PWG tool that is connected via a wireline to a high power source on the surface. The PWG tool may be positioned at the bottom of the wellbore such that the PWG array of radiating elements are disposed at a predetermined height (e.g., distance d) above the bottom of the borehole. The radiating elements positioned at the predetermined height may be operated to transmit electromagnetic radiation (e.g., microwaves) into the rock formation beyond the bottomhole by supplying electric power thereto via the wireline from the surface. The radiating elements of the tool may be configured to alternate between transmitting and receiving modes, sending pulse signals, capturing all reflections, and providing an image of the rocks ahead. The reflections will depend on the contrast between rock permittivity, which depends on the rock and fluid type. Higher reflections indicate higher contrast and lower reflections indicate lower contrast. The captured reflection data may be sent via the wireline back to surface, where it may be processed by inversion software to produce an image based on the wave reflections and time traveled. The generated image of the formation may indicate what lies ahead of the drill bit (e.g., highly fractured zones, vuggy formations, caverned formations, 'normal' rock formation with low permeability, and the like). The penetration depth of the plane wave (and corresponding imaging region) may be in the range of up to about 5 to 10 meters below the surface of the bottom of wellbore. Since the PWG tool is connected to and powered by electric power transmitted from the surface, more electric power can be applied (e.g., in the range of 200 W-60 kW) which could increase the plane wave penetration depth and resultant imaging range to 15-30 meters, depending on losses on the rock. Thus, the PWG tool may provide plenty of range to look ahead for drillers in a high risk zone. The drilling operator may thus be armed with knowledge of what lies ahead of the drill bit prior to drilling in potentially risky zones, giving the operator the opportunity to take necessary steps to minimize or prevent lost circulation problems or other drilling hazards. Thus, by detecting highly permeable formations beforehand, the operator may control the drilling operations to prevent or minimize drilling fluid or mud loss, and ensure wellbore stability and integrity.

FIG. 1 is a diagram that illustrates well environment 100 in accordance with one or more embodiments. In the illustrated embodiment, well environment 100 includes reservoir formation ("reservoir") 102 located in subsurface formation ("formation") 104, and well system ("well") 106. Formation 104 may include a porous or fractured rock formation that resides underground, beneath the Earth's surface ("surface") 108. Reservoir 102 may be a hydrocarbon reservoir formation, and well 106 may be a hydrocarbon well, such as an oil well. In the case of the well 106 being a hydrocarbon well, reservoir 102 may be a hydrocarbon reservoir defined by a portion of formation 104 that contains (or that is determined contain to or expected to contain) a subsurface pool of hydrocarbons, such as oil and gas, that coexist with formation connate water. Formation 104 and reservoir 102 may each include different or multiple layers, zones or media of rock having varying characteristics, such as varying degrees of lithology, permeability, porosity and fluid saturations. For example, one or both of formation 104 and reservoir 102 may include zones with medium or high permeability (e.g., lost circulation zones) that may cause loss of drilling fluid or mud during a drilling operation in which a drill bit bores through formation 104 and reservoir 102. Examples of lost circulation zones include super-K zones, fractured zones with varying fracture sizes and fracture densities, interconnected or individual vugular (vuggy) zones or formations, cavernous zones or formations, karsted zones, and other faulted characteristics of the carbonate rock formations having permeability.

Well 106 may include surface system 125 and wellbore 120 drilled with and controlled by equipment included in surface system 125. Wellbore 120 (or "borehole") may include a bored hole that extends downward from the earth's surface 108, into formation 104 and/or reservoir 102. An upper end of wellbore 120, at or near surface 108, may be referred to as the "uphole" end of wellbore 120. A lower end of wellbore 120, shown in FIG. 1 as being in reservoir 102, may be referred to as the "downhole" (or bottomhole) end of wellbore 120. For example, during the drilling operation stage when wellbore 120 is being drilled, the downhole end of wellbore 120 may initially be in formation 104, and gradually, as the drill bit bores through rock in formation 104, the downhole end of wellbore 120 may reach a desired depth in reservoir 102, where production or retrieval of hydrocarbons can begin. Wellbore 120 may be created, for example, by drill bit 180 boring through formation 104 and reservoir 102 during the drilling stage. Wellbore 120 may provide for circulation of drilling fluids during the drilling operations of the drilling stage, the flow of hydrocarbons (e.g., oil and gas; production fluid) from the reservoir 102 to surface 108 during production operations, the injection of substances (e.g., water; injection fluid) into formation 104 or reservoir 102 during injection operations, or the communication of monitoring or evaluation devices (e.g., logging tools, PWG tool 280 of FIG. 2) into formation 104 or the reservoir 102 during monitoring, formation evaluation, or control operations (e.g., during shut-in or flow well logging operations, upon detection of lost circulation during drilling, and the like). In some embodiments, wellbore 120 includes cased or uncased (or "open-hole") portions. A cased portion may include a portion of wellbore 120 lined with casing (e.g., the uphole end of wellbore 120 may be lined with casing pipe and cement). An uncased portion may include a portion of the wellbore 120 that is not lined with casing (e.g., the open-hole, downhole or bottomhole end of the wellbore 120). After completion of drilling operations and any necessary formation evaluation operations, after wellbore 120 has been drilled to a target depth, well 106 may be operated as a production well where well 106 may facilitate the extraction of hydrocarbons (e.g., "production" of production fluid) from reservoir 102.

As shown in FIG. 1, wellbore 120 may be encased by casing 150 that separates and isolates wellbore 120 from surrounding formation 104 (and reservoir 102) and associated subsurface materials (e.g., water, hydrocarbons, and the like). During the drilling stage of well 106, drill bit 180 may be lowered into borehole 120 and be suspended by drill string 160 to perform drilling operations. Drill bit 180 may bore through formation 104 and reservoir 102 to reach a desired depth. After the desired drilling depth has been achieved, the drilling operation may be completed, drill string 160 and drill bit 180 may be retrieved from wellbore 120, and a production tubing (not shown in FIG. 1) may be deployed inside annular space 155 of wellbore 120. Thereafter, when well 106 begins to operate as a production well, production fluid may be passed up to the surface through the production tubing (not shown). Although FIG. 1 illustrates well 106 as being an onshore well, this may not necessarily be the case. In another embodiment, well 106 may be an offshore well with wellbore 120 penetrating the seabed to reach and extract production fluids from reservoir 102. In case well 106 is an offshore well, components of surface system 125 may be provided on an offshore platform associated with and fluidly coupled to wellbore 120.

During the drilling stage as illustrated in FIG. 1, as wellbore 120 is being drilled, drill bit 180 may encounter lost circulation problems due to the lost circulation zones (e.g., highly fractured zones, vuggy formations, caverned formations, and the like) in formation 104 and/or in reservoir 102. For example, one or more sensors (not shown) may be disposed at one or more locations of well environment 100 including locations downhole inside wellbore 120 or the sensors may be disposed on the drill bit 180. The one or more sensors may be configured to detect one or more parameters associated with the drilling operation. In some embodiments, the sensors may be configured to detect whether the drilling fluid (or drilling mud) pumped into wellbore 120 returns to surface 108. That is, the sensors may be configured to detect an amount of fluid loss during the drilling operation. Based on the sensor data, and in response to determining that the amount of fluid loss during the drilling operation is more than a predetermined threshold amount, an operator controlling the drilling operation may determine (or surface system 125 may automatically determine based on corresponding predetermined control logic and the sensor data) that drill bit 180 has encountered a lost circulation zone that is causing the circulation loss of the drilling fluid and the need for formation evaluation prior to drilling further with drill bit 180. In response to the determination, the drilling operator may decide to temporarily halt the drilling operation and look ahead of drill bit 180 for evaluating the subsurface rock formation (formation evaluation operation or stage) beyond the current downhole or bottomhole of wellbore 120. For example, the drilling operator may control or operate one or more components of surface system 125 to pull drill string 160 and drill bit 180 out of borehole 120 to temporarily stop the drilling operation and perform formation evaluation as shown in FIG. 2.

Figure 2:
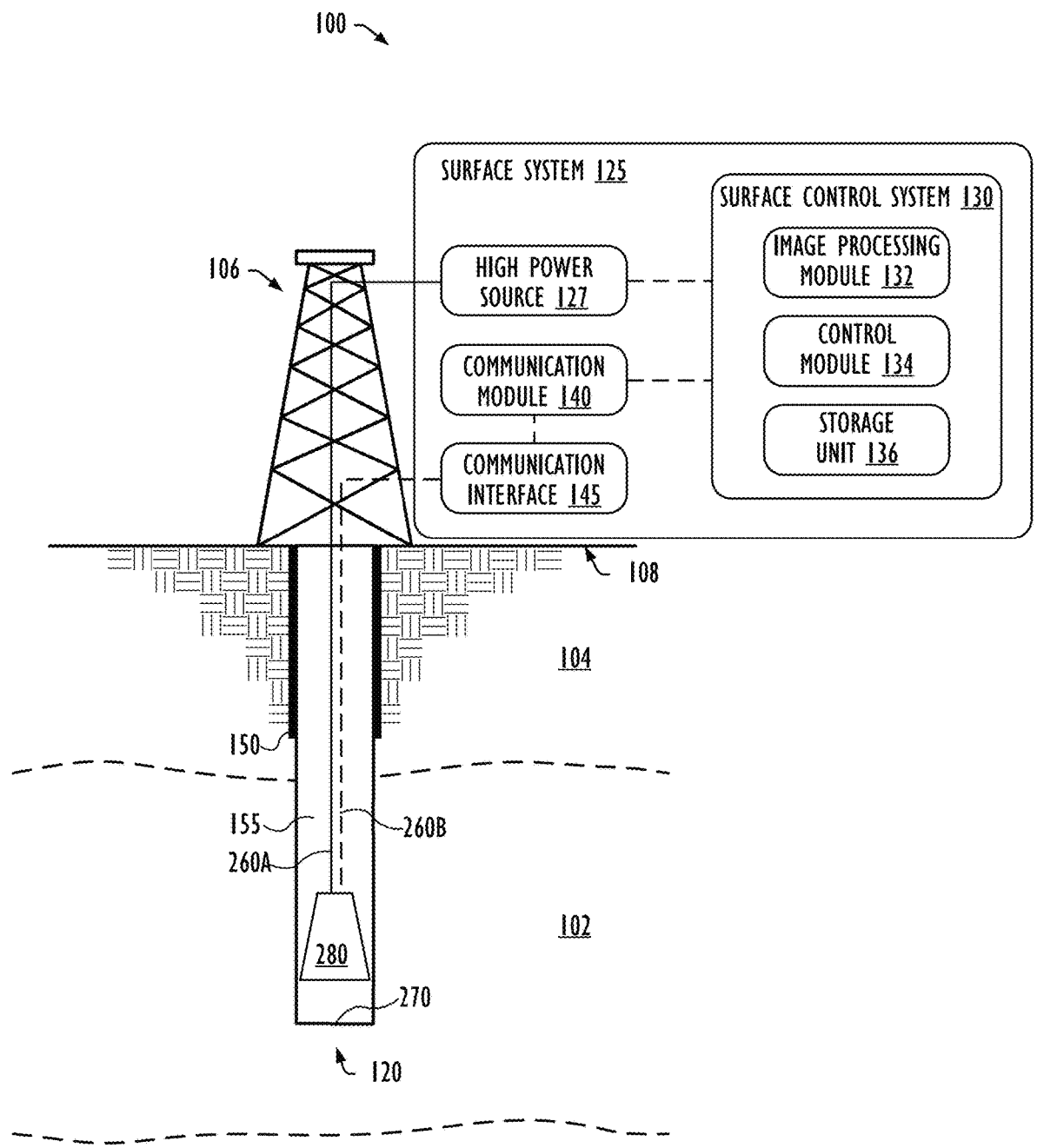
FIG. 2 is a schematic diagram of a well environment during a stage where formation evaluation is performed with a plane wave generator (PWG) tool in accordance with one or more embodiments.

To perform the formation evaluation, as shown in FIG. 2, the drilling operator may control or operate one or more components of surface system 125 to lower plane wave generator (PWG) tool 280 coupled via wireline 260 (including 260A and 260B) to surface system 125 into borehole 120. Alternatively, surface control system 130 may be configured to automatically determine based on predetermined control logic and the received sensor data that the drilling operation needs to be halted by pulling drill bit 180 out of borehole 120 and that the formation evaluation operation needs to be performed by deploying or lowering PWG tool 280 into borehole 120. As shown in FIGS. 1 and 2, well system 106 may include surface system 125 that is configured to control various operations of well system 106, including well drilling operations, formation evaluation operations, well completion operations, well production operations, well maintenance operations, and the like. Although not specifically shown in FIGS. 1-2, surface system 125 may include hoists, engines, valves, pumps, motors, sensors, controllers, pulleys, hydraulic systems, and other mechanical and electrical components, equipment, and sub-systems for controlling and executing the various operations.

The formation evaluation operation may be performed using plane waves synthesized by PWG tool 280 that is positioned at a predetermined height above the current bottom surface 270 of the borehole and that is operated to transmit (and receive) electromagnetic radiation (e.g., microwaves having frequencies between 300 MHz and 300 GHz, and wavelengths between 1 m and 1 mm) into (and from) the rock formation beyond the bottomhole surface 270. As explained previously, conventional systems to look ahead of the drill bit and perform formation evaluation may utilize inclined loop antennas or geosteering techniques. However, such conventional systems do not produce the beam directivity and penetration depth advantages that are produced by PWG tool 280, while also meeting the compact dimensionality requirements so that the tool can be disposed downhole inside a borehole having a small internal diameter (e.g., 8.5 inches).

Figure 3:
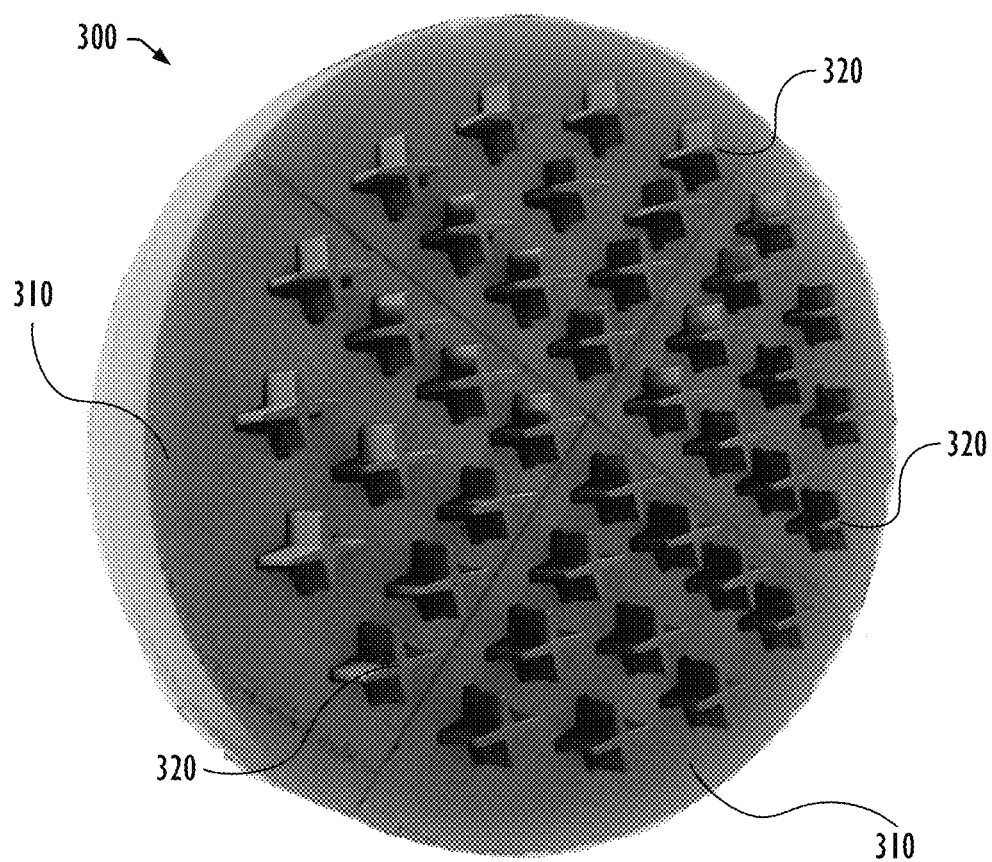
FIG. 3 is a perspective view illustrating an embodiment of a PWG system with an array of antenna elements disposed on a bottom surface of the PWG system.
Figure 4:
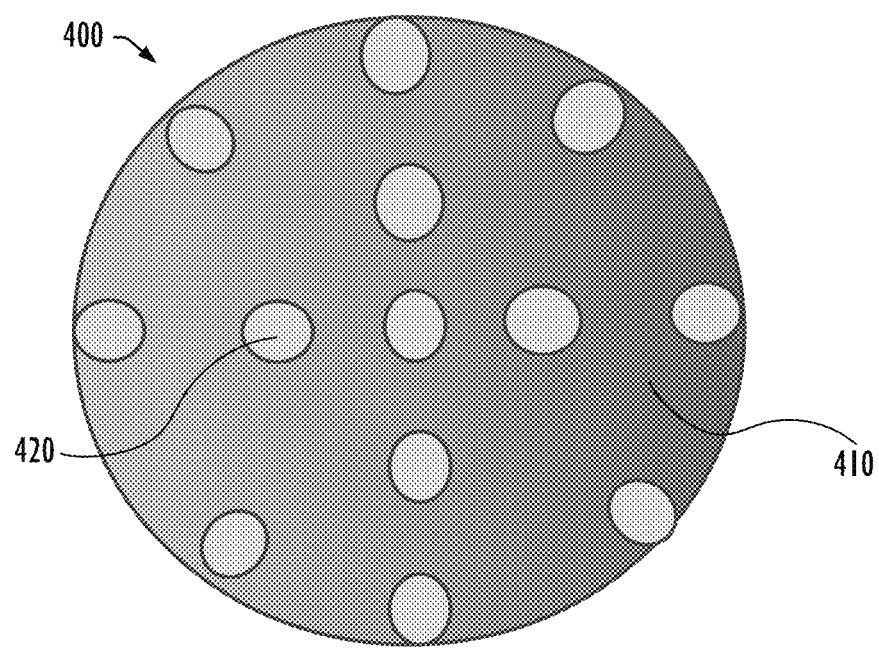
FIG. 4 is a bottom view illustrating another embodiment of a PWG system with an array of antenna elements disposed on the bottom surface of the PWG system.

Configuration and design, and principle of operation of PWG tool 280 are described in further detail in connection with FIGS. 2-6. As illustrated in FIG. 2, PWG tool 280 may be a downhole wireline tool that may be lowered to the bottomhole surface 270 by using wireline 260. As shown in FIGS. 3-4, PWG tool 280 may include an electromagnetic PWG array of radiating elements (e.g., a plurality of antenna elements) on a bottom surface thereof facing bottomhole surface 270. PWG tool 280 may be connected to high power source 127 on surface 108 via wireline 260A for providing electric power to the radiating elements thereof. Conventionally, plane wave generators have been used in anechoic chambers for antenna testing. A conventional compact antenna test range (CATR) with parabolic reflectors is used to allow electrically large antennas to be measured at a significantly shorter distance than would be necessary in a traditional far-field test range. As an alternative to the conventional CATRs that rely on parabolic reflectors, PWGs have been used in the field of antenna testing to achieve similar far-field testing conditions in the near-field, but with even more reduction in the distance to a quiet zone of plane waves from the PWG array, wherein an antenna under test may be positioned in the quiet zone for testing. In such antenna testing systems that utilize PWGs, an array of antenna elements is exploited to synthesize a plane wave in the near-field. Of course, such PWG-based antenna testing systems are not suitable for use in a downhole environment that involves significantly higher temperatures and pressures, limited dimensions dictated by the diameter of the borehole, and the requirement for lower frequencies and longer wavelengths in the quiet zone so as to achieve deeper penetration of the signal and corresponding increased imaging range of the underground rock formation.

A PWG tool according to the present disclosure has been designed, packaged, and implemented for use in a downhole environment so that the PWG tool can be deployed downhole inside the wellbore, can withstand the significantly higher temperatures and pressures of the wellbore, and enable drilling operators to look ahead of the drill bit. The PWG tool according to the present disclosure acts as a reflectometer which captures subsurface formation reflection coefficients in the frequency domain or acts as a ground penetrating radar (GPR) which captures subsurface formation reflections in the time domain. PWG tool 280 may include an array of radiating elements (e.g., metallic elements of copper or aluminum) that are disposed on a bottom surface thereof, that act as both transmitters and receivers of electromagnetic radiation (e.g., microwaves), and that generate an approximately plane wave over a finite volume in an imaging area called the quiet zone QZ (see FIGS. 5-6). The space between the array elements may be filled with microwave absorbers that can handle downhole temperatures and pressures. PWG array of tool 280 may be configured such that the plane wave condition can be achieved in close proximity to the array with suitably optimized complex coefficients, which will not be achievable with a regular conventional antenna of similar size.

Design parameters of a PWG system of PWG tool 280 (e.g., size, shape, and/or number of the individual antenna elements; division of the antenna elements into one or more clusters, each cluster controlled by a corresponding beam forming network (BFN); arrangement of the clusters (e.g., each cluster of elements arranged as a circular concentric ring of elements); arrangement of the array of elements on the PWG base; size or shape of the PWG base on which the array elements are mounted; materials used for the individual array elements and the absorbent material of the PWG base; beam forming network architecture and components used; number of clusters; electric power signal applied to the radiating elements; and the like) may determine the frequency bandwidth and wavelength of the emitted electromagnetic (e.g., microwave) signals (and of the synthesized plane wave), which in turn may determine the expected penetration of the generated electromagnetic signal (and resultant imaging range or depth). Several design considerations and limitations may be taken into account when optimizing and setting the design parameters of the PWG system so as to synthesize a desired plane wave, while ensuring the system can be utilized for a downhole environment. Further, the design considerations may require making trade-offs between optimal design parameters of the PWG system. For example, larger radiating elements are better for lower frequencies as they will fail to transmit the higher frequencies. Further, each radiating element must be small enough to fit the lattice (e.g., PWG base) and radiate a nearly constant spherical pattern. As an approximation, the longest wavelength (and lowest frequency) that can be achieved may be around 90% of the diameter of an outer cluster of radiating elements (e.g., outer concentric ring of array elements) and the quiet zone may have a diameter that is around 75%-80% of the diameter of the outer cluster of radiating elements. In downhole terms, the diameter of the outer cluster of radiating elements will be limited by the diameter of the borehole.

Since an electromagnetic signal (and corresponding synthesized plane wave) having a lower frequency bandwidth (and longer wavelength) may result in a deeper penetration of the plane wave into the subsurface formation beyond the bottomhole of the wellbore, it is desirable to optimize and set the design parameters of the PWG system of PWG tool 280 so that the frequency of the synthesized plane wave may be minimized, while achieving a desired quiet zone of plane waves and taking into account the design considerations and limitations of the downhole environment. In some embodiments, given the circular shape of the borehole, the PWG array of PWG tool 280 may be designed and packaged as a circular array made of several concentric rings of antenna elements mounted on a cylindrical base of absorbent material, each concentric ring of antenna elements corresponding to a cluster of antenna elements controlled by a corresponding beam forming network (e.g., transceiver module).

As shown in FIG. 2, PWG tool 280 may include a metallic casing that can be suspended downhole inside wellbore 120 by wireline 260 that includes power line 260A to supply electric power to the PWG array of radiating elements and to other electronic components disposed downhole (including one or more components housed inside the metallic casing of PWG tool 280). The metallic casing of PWG tool 280 may house one or more electronic components (e.g., power dividers, attenuators, phase shifters, resistors, sensors and the like) of PWG tool 280 and the PWG system, and may be adapted to withstand high temperatures and pressures of the downhole wellbore 120 environment. The one or more electronic components of tool 280 may be made with high temperature electronics materials such as Silicon, Silicon on Insulator, Gallium Arsenide, and the like. Wireline 260 may further include control/data line 260B for bi-directional communication between the one or more electronic components and the PWG system of PWG tool 280 and surface system 125.

The casing may further house the PWG system that is communicatively and electrically coupled to the one or more electronic components housed in the casing, and such that the PWG array of radiating elements is disposed on the bottom surface of PWG tool 280 and adapted to face the current bottom surface 270 of wellbore 120 when disposed downhole. The PWG system may include a beam forming network (BFN) architecture, and the PWG array of antenna elements that are divided into clusters of antenna elements and arranged as, e.g., circular concentric rings. Upon application of electric power from power source 127 and via wireline 260A, each array element may radiate a constant pattern that may be spherical. Further, by using the circular lattice array of radiating elements, the quiet zone of plane waves may be generated in circular 2D or spherical 3D at a predetermined distance from the array.

By varying the complex excitation coefficients of the radiating elements, a uniform quiet zone can be created with a desired distance and size, where the radiated electromagnetic field has uniform amplitude and phase. Unfortunately, the ideal excitation coefficients are somewhat frequency dependent. The uniform field in the quiet zone can be obtained using a passive Beam Forming Network (BFN), using attenuators and phase shifters to weight the excitation of the array elements. The clear advantage of such solution is the lack of active components and the consequent simplicity of the architecture with reduced costs. On the other hand, a completely passive network is inherently narrowband. Since the goal is the achieve deeper penetration of the plane wave in the quiet zone, a passive BFN for the PWG array may suffice, especially because the passive BFN minimizes the number of electronic elements needed for PWG tool 280. A digital BFN with dedicated transceivers for each array element would allow the complete control of the array, and provide broadband capabilities. However, this solution is not cost-effective. Another practical and cost-effective solution for PWG tool 280 may be a combination of the passive and digital BFN by dividing the PWG array into clusters of elements (e.g., clusters organized in concentric rings, each cluster including one or more radiating element). This way, the elements of the same cluster are always excited with the same amplitude and phase through a passive BFN, while a limited number of parallel transceiver modules can control the relative amplitude and phase weights between the different clusters (one transceiver module per cluster or circular ring of elements). With this approach, a large bandwidth capability can be obtained by the frequency dependent excitation and the overall cost and complexity of the PWG system is lowered by the reduction in number of active components. A further design trade-off for such system is to find the optimum balance between the number of clusters (i.e., number of concentric rings) and the performance of the PWG array. Such a PWG tool 280 that utilizes the combination of passive and digital BFN can thus achieve broadband capabilities, allowing an operator to use the lowest frequency when maximum penetration of the plane wave in the quiet zone is needed, while also providing the option to use other, higher frequencies.

Thus, the PWG system of PWG tool 280 may include a BFN architecture of attenuators and phase shifters, a PWG array made of concentric rings of radiating elements, each radiating element having radiation characteristics that depend on the relation between the dimensions of the element and the radiation efficiency of the array. The BFN architecture of PWG tool 280 may include a combination of passive and digital BFNs (or only passive BFNs) implemented by dividing the radiating elements into clusters of elements. The PWG antenna array may be a circular array made of several concentric rings given the shape of the borehole (so as to achieve the widest possible quiet zone diameter). The (one or more) elements on each concentric ring are considered a cluster with equal amplitude and phase excitation by means of high accuracy passive power dividers. The complex amplitude and phase excitation of each cluster is electronically controlled by a transceiver module corresponding to the cluster. The BFN architecture thus individually controls relative amplitude and phase weights between the different clusters of antenna elements when both passive and digital BFNs are employed, while exciting the one or more elements within the same cluster with the same amplitude and phase. As mentioned previously, smaller radiating elements achieve higher frequencies and larger radiating elements achieve lower frequencies. That is, the maximum physical dimension of the radiating element is related to the maximum operating frequency. Larger radiating elements are desirable so as to achieve lower frequency. Further, the radiating element must be physically small enough to fit in the lattice (e.g., PWG base) and radiate a nearly constant spherical pattern in the usable bandwidth of the array.

FIGS. 3 and 4 illustrate exemplary designs, shapes, and layouts of the PWG array of PWG tool 280. In particular, FIG. 3 is a perspective view illustrating an embodiment of PWG system 300 with the array of antenna elements 320 disposed on a bottom surface of the PWG tool. As shown in FIG. 3, PWG system 300 includes a cylindrical base of absorbent material on which four concentric rings of array elements 320 (i.e., four clusters of array elements each controlled by a corresponding transceiver) are disposed. Each concentric ring of array elements 320 may have its own BFN (or excitation source). This gives flexibility to weight the electromagnetic excitation to produce a broad bandwidth. Further, the individual array elements may be designed to produce a low frequency. The space between array elements 320 may be filled with microwave absorbent material 310 that can handle downhole temperatures and pressures. Although FIG. 3 illustrates a PWG system with four concentric rings of array elements, this is not intended to be limiting.

For example, the PWG array may include 3-6 concentric rings (or clusters) of array elements, and by using a BFN where each ring is independently excited, the total number of array elements can be reduced. As mentioned, the size of the elements will also determine the lowest frequency. So if there are only 3 concentric rings, PWG tool 280 can include larger array elements and thus achieve a lower frequency for more signal penetration. On the other hand, if PWG tool 280 includes more concentric rings or clusters of array elements, and thus smaller elements, the tool may achieve larger frequencies, and thus less penetration (but have broadband capabilities). FIG. 4 is bottom view illustrating another embodiment of PWG system 400 with the array of antenna elements 420 disposed on the bottom surface of the PWG tool. As shown in FIG. 4, PWG system 400 includes a cylindrical base of absorbent material with the PWG array of elements mounted to the base and the space between the array elements 420 filled with microwave absorbent material 410 that can handle downhole temperatures and pressures. PWG system 300 and 400 of FIGS. 3 and 4 is thus able to create a plane wave with only a few (e.g., 3-6) parallel transceivers for the array.

Design parameters of PWG system 300 or 400 of PWG tool 280 (e.g., size, shape, and/or number of the individual antenna elements; division of the antenna elements into one or more clusters, each cluster controlled by a corresponding beam forming network (BFN); use of passive and/or digital BFNs; arrangement of the clusters (e.g., each cluster of elements arranged as a circular concentric ring of elements); arrangement of the array of elements on the PWG base; size or shape of the PWG base on which the array elements are mounted; materials used for the individual array elements and the absorbent material of the PWG base; beam forming network architecture and components used; number of clusters; electric power signal applied to the radiating elements; and the like) are not intended to be limiting. For example, the design parameters may be optimized based on the size of the borehole where PWG tool 280 may be deployed and based on characteristics of the quiet zone (e.g., location of the quiet zone relative to the plane wave generator array, frequency, wavelength, signal penetration depth, beam directivity, beam diameter, broadband capabilities, and the like) that PWG tool 280 is designed to synthesize.

As explained above, PWG system 300 or 400 of PWG tool 280 used for formation evaluation downhole wellbore acts as a reflectometer which captures the reflection coefficients of subsurface formations in frequency domain or as a GPR which captures reflections of the rock formations in time domain. Each antenna element 320 or 420 could be an aperture antenna that may be circular, squared, horned, and the like. Antenna element 320 or 420 may be filled with dielectric material that has low loss, and that can resist high temperature and pressures of a downhole operating environment. The filling dielectric material for the PWG system could be selected depending on the expected temperature, pressure and drill mud of a particular wellbore. For example, for high temperature downhole environments where temperature is greater than 110° C., the filling material could be quartz or other well characterized crystal like sapphire, diamond, and the like. For downhole environments where temperature is less than 110° C., the filling material could be any type of modified resin consisting of amorphous blends of Polyphenylene Oxides (PPO) or polyphenylene ether (PPE) resins with polystyrene. As one example, the filling material for wellbores with temperatures less than 110° C. could be glass filled Noryl.

Microwave absorbent material 310 or 410 may be made with high strength, temperature resistant microwave absorbent material, such as ceramic (e.g., silicon carbide with different surface modifications with other ceramics or metal oxides, such as Ni—SiC, SiC/SiO2, NiO—SiC, Fe—SiC/SiO2, and the like), carbon based material (e.g., material with carbon nanotubes (CNT), multi wall carbon nanotubes (MWCNT), or reduced graphene oxide (r-GO) such as: r-GO/SiC, r-GO/SiO2, MWCNT/SiO2, CNT-ZnO/SiC, and the like). Since it is desirable to synthesize the plane wave with a low frequency to achieve deeper penetration of the signal, the PWG array of system 300/400 need not be broadband (i.e., array need not produce a broad frequency bandwidth). Further, although FIGS. 3 and 4 show the PWG array made up of concentric rings (or clusters) of array elements, with a BFN independently exciting each ring of elements, this arrangement of radiating elements is for illustrative purposes only. Any arrangement of the radiating elements of the array on the PWG base absorbent material may be applicable so long as a plane wave with desired characteristics can be synthesized at a desired quiet zone location relative to the plane wave generator, and achieve desired signal penetration depth, beam directivity, beam diameter, broadband capabilities, and the like.

Referring again to FIG. 2, during operation, PWG tool 280 may be lowered into borehole 120 after pulling the drill string out of the borehole, when there is a need to look ahead of the drill bit. PWG tool 280 is a wireline tool that is connected to high power source 127 for synthesizing the plane wave via wireline 260. When power is supplied to PWG downhole tool 280 from power source 127 at the surface via wireline 260A, the radiating elements of tool 280 will alternate between transmitting and receiving modes (like a radar antenna). In general, PWG tool 280 will send a pulse signal and in a given time window, capture all the reflections (as a regular ground penetrating radar (GPR)) to provide an image of the rock formations ahead. As mentioned previously, the reflections will depend on the contrast between rock permittivity, which depends on the rock and fluid type. Thus higher reflections indicate higher contrast and lower reflections indicate lower contrast. With this technique, lost circulation zones like Karstend, Diogentic, fractured, or vuggy zones can be identified. The reflection data may be sent via wireline 260B back to surface, where it will be processed by surface control system 130 for a permittivity prediction and generation of image data. Thus, PWG tool 280 acts as a borehole GPR. However, as opposed to conventional borehole GPRs, the PWG system of PWG tool 280 can produce plane waves at a very short distance from the emitting antenna, allowing for longer penetration into the rock and easier wave inversion to obtain rock properties. Use of PWG technology for tool 280 allows use of a smaller, more compact apparatus that would otherwise not fit in the borehole.

In the exemplary embodiment shown in FIGS. 1 and 2, surface system 125 includes high power source 127, surface control system 130, communication module 140, and communication interface 145. Surface control system 130 may include image processing module 132, control module 134, and storage unit 136. Surface control system 130 may be configured to monitor and control operations of drilling, formation evaluation, completion and/or production of well 106. In some embodiments, surface control system 130 may include a computer system that is the same as or similar to that of computer system 800 described with regard to at least FIG. 8.

Power source 127 may be a surface-based high-power source providing electric power in the range of approximately 200 W to 60 kW to PWG tool 280 via wireline 260A. As explained previously, the array of radiating elements of the PWG tool 280 may be configured to generate electromagnetic (e.g., microwave) signals based on the received electric power from power source 127. Power source 127 may be disposed at a location proximate to well 106 and electrically coupled to tool 280 via wireline 260A. Alternately, power source 127 may be provided at a location that is distal to well 106 and may be electrically coupled to wireline 260A of surface system 125 via a power cable. Wireline 260 may be a multi-conductor, single conductor or slickline cable, or "wireline", that can be introduced into well 106 to deliver and retrieve tools downhole. Wireline 260 may include electrical cable 260A and data cable 260B used to lower tools into wellbore 120, provide electric power to the wireline tools, and transmit data about the conditions of wellbore 120. Wireline 260 may include braided cables and may be used to perform wireline logging as well. As shown in FIG. 2, wireline 260A may provide electric coupling between PWG tool 280 and power source 127 and is capable of transmitting high power signals to the radiating elements of PWG tool 280. Further, wireline 260B may provide communication coupling for control signals and data transmission between surface control system 130 and PWG tool 280 via communication module 140 and communication interface 145. Wireline 260B may be capable of transmitting data at a high rate. As shown in FIG. 2, wireline 260B for data and control signal communication may run along the length of wellbore 120. Alternately, or in addition, PWG tool 280 may be communicatively coupled to communication interface 145 wirelessly via fluid harmonics or using electromagnetic signals transmitted downhole via annular space 155 of borehole 120. Surface control system 130 may thus receive data (e.g., sensor data, reflection signal and timing data, and the like) from downhole PWG tool 280 and generate image data for the formation evaluation operation based on the received data. Storage unit 136 may be configured to store logic (e.g., inversion software) that is capable of producing an image based on reflection data and timing data received from the downhole PWG tool 280. The wave reflection data may indicate amplitude and phase of the reflection signal captured by the radiating elements of PWG tool 280 and/or the timing data may indicate travel time of the reflection signal captured by the radiating elements of tool 280.

The formation evaluation operation performed with PWG tool 280 and resulting generation of image data will be explained in further detail below by way of a concrete example and in connection with formation evaluation of an exemplary formation illustrated in FIGS. 5 and 6. Consider a situation where a wellbore is being drilled with an 8.5" drill bit. Since it is desirable to use the lowest possible frequency to achieve deeper penetration of the plane wave during the formation evaluation operation, the PWG array of the PWG tool that fits the 8.5" borehole may be designed to have large radiating elements. Such a PWG array may generate electromagnetic signals having ~1.7 GHz frequency and a corresponding wavelength of ~18 cm (in air). A conventional horn antenna for such frequencies and wavelengths will not be compact enough to fit into an 8.5" borehole. Thus, better penetration and resultant deeper formation evaluation can be achieved by utilizing the PWG system according to the present disclosure over conventional GPR or other borehole radar based systems of similar size. Another advantage of using a PWG as according to the present disclosure, as opposed to the conventional methods described above, is that the other methods do not have the antenna beam directivity nor produce plane waves. As a result, the image data generated by using conventional techniques results in an average image quality due to the excessive number of reflections of the transmitted signals which limit the ability to obtain a true image of the rocks ahead. With the PWG system of the PWG tool of the present disclosure, the microwaves penetrate the rock formation beyond the bottom surface of the wellbore as plane waves, resulting in determination of more accurate values for electromagnetic properties (e.g., electrical conductivity, magnetic permeability, and electric permittivity) of the fluid filled rock formation in the imaging range defined by the quiet zone.

During the drilling operation (e.g., shown in FIG. 1), the drilling operator may start to notice lost circulation problems. For example, based on sensor data showing the amount of drilling mud returned to the surface, the drilling operator may determine (or a control system may automatically determine and notify the operator) that the amount of fluid loss is higher than a predetermined acceptable threshold amount. Based on this determination, the drilling operator may decide to see what lies ahead of the drill bit by pulling out the drill bit from the wellbore and lowering PWG tool 280 into the section that was just drilled (e.g., the current bottomhole or downhole end surface 270 of wellbore 102). To synthesize a quiet zone with a plane wave of the microwave signals generated by the radiating elements of the array, PWG tool 280 may be positioned so that the PWG array is at a distance of approximately 7-10 times the wavelength (in air) of the generated signal above the current bottomhole end surface 270 of wellbore 120. PWG tool 280 may then be electrically powered using power source 127 at the surface to generate electromagnetic signals having ~1.7 GHz frequency and a corresponding wavelength of ~18 cm (in air). The distance of approximately 7-10 times the wavelength is an approximation to obtain a quiet zone QZ of plane waves at a close distance from the array as illustrated in FIGS. 5-6. Wavelength of the generated electromagnetic signal will depend on the medium. For example, if the generated electromagnetic signal has ~3 GHz frequency, the corresponding wavelength will be ~10 cm in air, but ~3-6 cm in another medium (e.g., water based liquid, drilling mud, and the like) depending on characteristics such as liquid composition, temperature, and the like.

Figure 5:
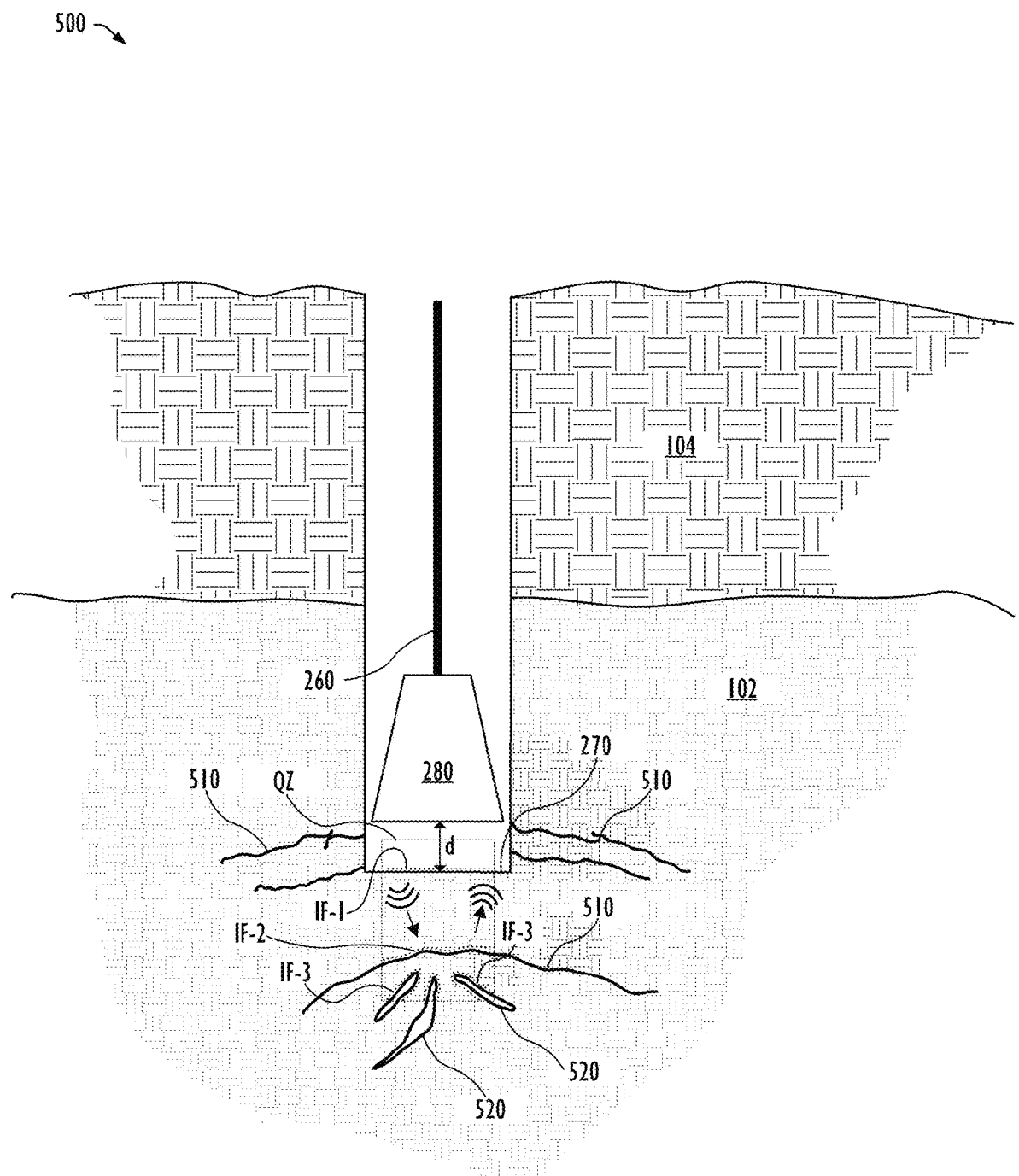
FIG. 5 is a schematic diagram illustrating an embodiment of the PWG tool deployed downhole in the wellbore during the formation evaluation stage.

FIG. 5 is a schematic diagram 500 illustrating an embodiment of PWG tool 280 deployed into wellbore 120 during the formation evaluation stage. As shown in FIG. 5, the PWG array of PWG tool 280 may be positioned at a distance d above bottom 270 of the wellbore. Continuing the above example of the PWG array that fits a 8.5" hole and generates approximately 18 cm wavelengths in air (~1.7 GHz frequency), the distance d of the PWG array from the bottom surface 270 may be approximately 126 cm to 180 cm. With high power signal supplied from power source 127 to such a PWG array, the quiet zone QZ of plane waves may be created directly underneath the PWG tool 280 in the space between the array and bottom surface 270, and extend beyond the bottom surface 270 of the wellbore and into the rock formations which may include lost circulation zones.

In case of the above example, the plane waves may penetrate approximately 15 meters into the subsurface formation beyond the bottom 270 of the wellbore and an image may be generated based on the reflected signals from the quiet zone QZ to detect any lost circulation zones that could cause severe lost circulation problems. For example, as shown in FIG. 5, the PWG tool 280 may generate quiet zone QZ directly underneath PWG tool 280 and at a short distance from the PWG array disposed at a distance d from bottom surface 270 of the wellbore. The quiet zone QZ may have a diameter that is approximately 75%-80% of the diameter of the outer ring of elements of the PWG array. Reservoir formation 102 and lost circulation zones like naturally fractured zones 510, vuggy space or zones 520, and the like that fall within the quiet zone QZ may be irradiated with the generated plane waves. And PWG tool 280 may generate an image of the quiet zone QZ based on the received reflections of the plane waves from the QZ (e.g., reflections corresponding to interfaces IF-1, IF-2, IF-3, and the like).

Figure 6:
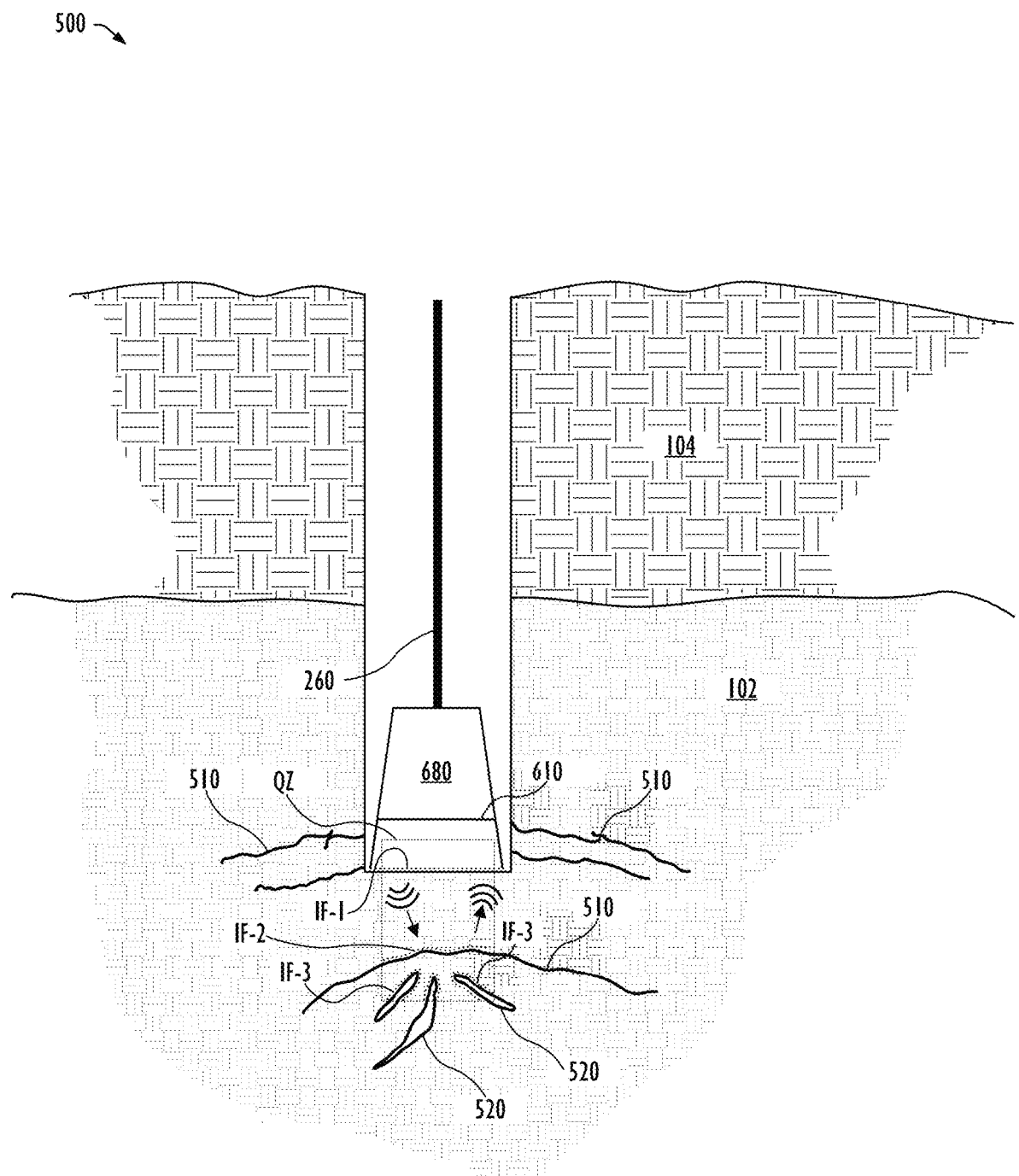
FIG. 6 is a schematic diagram illustrating another embodiment of the PWG tool deployed downhole in the wellbore during the formation evaluation stage.

As shown in FIG. 6, to fix the desired distance d and accurately position the PWG array above the bottom of the wellbore, separator 610 may be coupled to the bottom surface of PWG tool 680 so as to be disposed between PWG tool 680 and bottom surface 270 of the wellbore. A height of separator 610 may be equal to the distance d. Separator 610 may include microwave absorbent material (e.g., material 310/410 of FIGS. 3-4) disposed on an inside thereof to establish the known separation distance d between the emitting PWG array and the bottom of the borehole. Thus, separator 610 may enable PWG tool 280 to establish the distance between the PWG array and a first interface (IF-1) defined by the borehole bottom to a known distance (e.g., approximately 1.5-2 times the wavelength).

The radiating elements of PWG tool 280 or 680 may act as a reflectometer and alternate between transmitting and receiving modes to transmit microwaves that synthesize into plane waves in the quiet zone QZ at the very short distance from the radiating elements and receive reflections of the plane waves from the quiet zone QZ to capture reflection coefficients in the frequency domain or capture reflections in a given time window in the time domain. The received reflections will depend on the electromagnetic properties (e.g., electrical conductivity, magnetic permeability, and electric permittivity) of the different media, formations, zones or layers in the quiet zone QZ which may include portions above and/or below the bottom surface 270 of the wellbore.

The reflection and transmission coefficients of one or more interfaces (e.g., IF-1, IF-2, IF-3, and the like) within the quiet zone QZ are given by the change in complex permittivity between mediums (e.g., rocks with pore fluid). At the boundary or interface between two media (e.g., first boundary defined by the interface IF-1 (See FIGS. 5-6) between drilling mud filling the downhole end of the wellbore and bottom surface 270 of the wellbore, second boundary defined by the interface IF-2 (See FIGS. 5-6) between reservoir formation 102 and fractured zone 510 in the quiet zone QZ, third boundary defined by the interface IF-3 (See FIGS. 5-6) between reservoir formation 102 and vuggy zone 520 in the quiet zone QZ, and the like), some energy will be reflected and the remainder transmitted. The reflected field strength is described by the reflection coefficient, R, which depends on the contrast of the intrinsic impedance η:

$$R = \frac{\eta_2 - \eta_1}{\eta_2 + \eta_1}$$

$$\eta = \sqrt{\mu/\varepsilon}$$

The reflection data may include amplitudes and phases of the reflection coefficient R or travel time and amplitude of the reflection. Reflection data may be sent via wireline (e.g., wireline 260B of FIG. 2) to the surface, where the data may be processed (e.g., by image processing module 132 of FIG. 2) for permittivity prediction and generation of image data. For example, the radiating elements may convert the received electromagnetic waves into electric signals, and then the one or more components of PWG tool 280 or 680 may convert the electric signals into digital data, which may then be transmitted as reflection data via wireline 260B to the surface. The image processing module 132 may perform the inversion to obtain or predict complex permittivity from the reflection data of the quiet zone QZ by using electromagnetic properties (e.g., electrical conductivity, magnetic permeability, and electric permittivity) of the first rock layer (e.g., IF-1 in FIGS. 5-6). Electromagnetic properties (e.g., electrical conductivity, magnetic permeability, and electric permittivity) of fluids (e.g., drilling mud) in the wellbore and the known distance d information may be used together with the reflection data of the first rock layer (e.g., IF-1) of the quiet zone QZ for the complex permittivity prediction. The image processing module 132 may easily compute the complex permittivity for the first rock layer if separator 610 is used to establish the known distance d and the permittivity of the drilling fluid in the wellbore is known. To invert the subsequent reflections (e.g., IF-2, IF-3, and the like) in the time domain, the image processing module may use an approximation of the rock layer above and the transit time. And to invert the subsequent reflections in the frequency domain, the image processing module may apply different time gate windows.

Although FIGS. 2-6 describe PWG tool 280/680 as being a wireline tool that is deployed into the borehole after removal of the drill string and drill bit during the drilling operations, this may not necessarily be the case. In some embodiments, the PWG array can also be made into a smaller array so that the PWG tool may be used as a measure while drilling tool (MWD) or a formation evaluation wireline tool. Such a tool may be disposed on the bottomhole assembly (BHA) or on the drill bit to allow imaging of the rock ahead without having to remove the drill string and drill bit out of the borehole. Further, although FIGS. 2-6 describe the PWG array of PWG tool 280/680 as being disposed on the bottom surface thereof (i.e., array of radiating elements facing the bottom surface of the borehole), this may not necessarily be the case. In some embodiments, the PWG array may be disposed on PWG tool 280/680 so as to face the side walls (i.e., the cylindrical walls) of the wellbore to obtain an image of the rocks on the lateral or horizontal sides of the wellbore.

Figure 7:
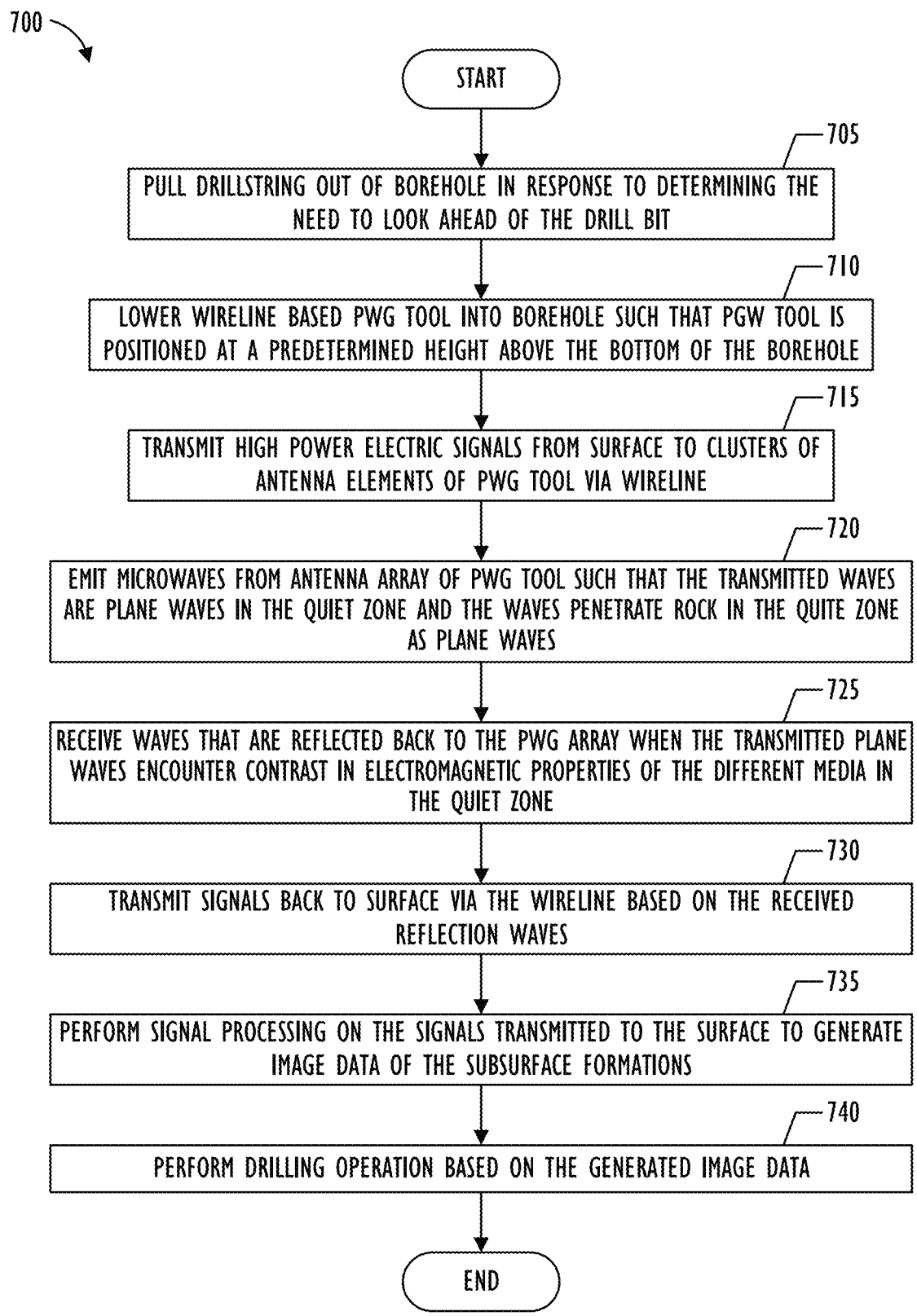
FIG. 7 is a flow chart that illustrates a method of operating the PWG tool in accordance with one or more embodiments.

FIG. 7 is a flow chart that illustrates method 700 of operating the PWG tool in accordance with one or more embodiments. Method 700 begins at block 705 where, in response to determining the need to look ahead of the drill bit, the drill bit and the drill string are pulled out of the borehole. As explained in connection with FIG. 1, during the drilling operation, the operator may detect a sudden loss in the amount of drilling fluid returning to the surface. For example, the operator may observe sensor data or a control system (e.g., surface control system 130 of FIG. 1) may include predetermined control logic that automatically determines based on received sensor data that the amount of fluid loss of the drilling fluid or drilling mud is higher than a predetermined threshold amount. Such a lost circulation problem may be the result of the drill bit boring into a lost circulation zone (e.g., fractured zone 510 or vuggy zone 520 of FIGS. 5-6) that causes loss of the drilling fluid during the drilling operation. Based on the detected lost circulation problem by the operator (or automatic detection by a surface control system), the operator may determine that the time and effort necessary to pull the drill string and drill bit out of the borehole is justified in order to look ahead of the drill bit and perform the formation evaluation with the PWG tool prior to drilling further. For example, the drilling operator may control or operate one or more components of surface system 125 of FIG. 1 to temporarily stop the drilling operation and pull the drill string 160 and drill bit 180 out of the borehole 120.

Method 700 then proceeds to block 710 where the drilling operator operates the surface system to lower the PWG tool into the borehole. For example, as shown in FIG. 2, the operator may control or operate surface system 125 to lower PWG tool 280 into borehole 120. PWG tool 280 may be implemented as a wireline tool that can be lowered into wellbore 120 by wireline 260 that provides electric power for powering tool 280, and also enables data and control signal communication between surface system 125 and tool 280. Although not shown in FIG. 2, PWG tool 280 may include sensors to enable surface control system 130 to position PWG tool 280 at a predetermined distance d above the current bottom surface 270 of the wellbore 120. For example, surface control system 130 may operate components of surface system 125 based on sensor data to lower PWG tool 280 such that the PWG array on the bottom surface of the tool is positioned at a distance d above the bottom surface 270 of the wellbore 120. Distance d may be approximately 7 times the wavelength (in air) of the electromagnetic signal that is emitted from the radiating elements of the PWG array. Alternately, in case the tool include a separator (e.g., PWG tool 680 of FIG. 6 with separator 610 coupled thereto), the operator may simply be able to lower tool 680 to the bottom surface 270 of the wellbore to establish a known distance between the emitting PWG array and the bottom of the borehole because of the separator disposed between PWG tool 680 and bottom surface 270 of the wellbore.

At block 715, the drilling operator may control or operate power source 127 to transmit high power electric signals from power source 127 at the surface to the PWG array of the PWG tool in order to generate an image of the rocks that lie beyond the bottomhole surface. As explained previously, power source 127 may be a high-power source capable of providing electric power to PWG tool 280 via wireline 260A in the range of approximately 200 W to 60 kW. PWG tool 280 may include a PWG system including a BFN architecture and an array of radiating elements. The BFN architecture may include a combination of passive and digital BFNs (or only passive BFNs) implemented by dividing the radiating elements into clusters of elements. The PWG array may be a circular array made of several concentric rings of elements given the shape of the borehole. The array elements on each concentric ring are considered a cluster with equal amplitude and phase excitation by means of high accuracy passive power dividers (e.g., transceivers). By applying power to the limited number of parallel transceiver modules (one per cluster or ring of radiating elements) the PWG tool 280 (or 680) may be able to synthesize a plane wave from the radiated electromagnetic signals at a very short distance from the PWG array and create a quiet zone (e.g., quite zone QZ of FIGS. 5-6 that extends from a region above the bottom surface 270 of the wellbore to a region below the surface 270) (block 720).

Since the rock formation ahead of and directly underneath the bottom surface 270 of wellbore is in the quiet zone, the waves emitted from the radiating elements in this region are plane waves and they penetrate the rock formation as plane waves. For the plane waves penetrating the rock formation in the quiet zone as plane waves, when contrast in electromagnetic properties (e.g., electrical conductivity, magnetic permeability, and electric permittivity) of the different media, formations, layers, or zones in the quiet zone QZ are encountered (e.g., contrast or difference in electromagnetic properties encountered at each of interfaces IF-1, IF-2, IF-3 and the like in FIGS. 5-6), the microwaves may be partially reflected and partially transmitted through the different media based on respective reflection and transmission coefficients. These reflected waves traveling back to the PWG array may be received by the clusters of radiating elements of the PWG array acting as a receiver (block 725) and converted into electric signals (and further, into reflection data) that may be transmitted back to surface system 125 via wireline 260B (block 730). The reflection data may be stored at the surface in storage unit 136.

At block 735, surface control system 130 may process the received reflection data (stored in storage unit 136) for permittivity prediction and generation of image data of the rock formation below the bottomhole of the wellbore using inversion software. As explained previously, control module 134 may control image processing module 132 to perform the inversion to obtain or predict complex permittivity from the reflection data of the quiet zone QZ by using electromagnetic properties (e.g., electrical conductivity, magnetic permeability, and electric permittivity) of the first rock layer (e.g., IF-1 in FIGS. 5-6). To invert the subsequent reflections (e.g., corresponding to IF-2, IF-3, and the like in FIGS. 5-6) in the time domain, the image processing module may use an approximation of the rock layer above and the transit time. To invert the subsequent reflections in the frequency domain, the image processing module may apply different time gate windows. The generated image data may thus enable the drilling operator to visualize the rock for a range of approximately 15-30 meters below the bottomhole, and detect any upcoming lost circulation zones (e.g., zones 510 or 520 in FIGS. 5-6) to minimize fluid loss during the drilling stage. Thus, the PWG tool may provide plenty of range to look ahead for drillers in a high risk zone. The drilling operator may thus be armed with knowledge of what lies ahead of the drill bit prior to drilling, giving the operator the opportunity to take necessary steps to minimize or prevent lost circulation problems or other drilling hazards. By detecting highly permeable formations beforehand, the operator may control the drilling operations to prevent or minimize lost circulation problems, and thereby ensure wellbore stability and integrity (block 740).

Figure 8:
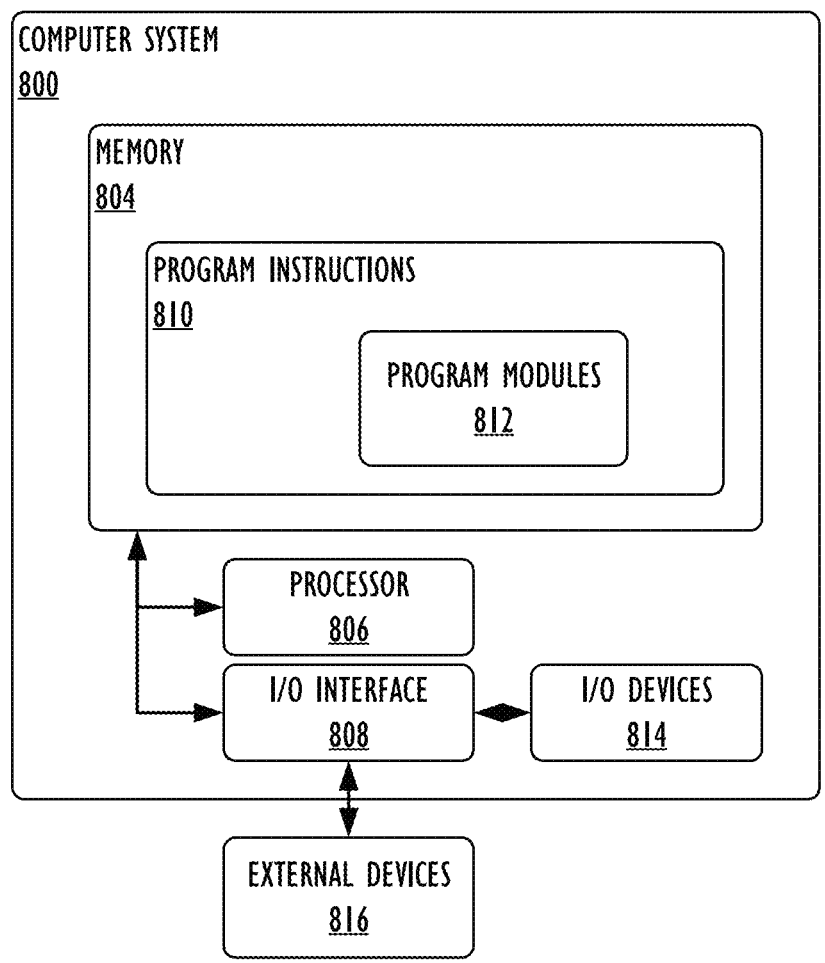
FIG. 8 is a functional block diagram of an exemplary computer system in accordance with one or more embodiments.

FIG. 8 is a functional block diagram of an exemplary computer system (or "system") 800 in accordance with one or more embodiments. In some embodiments, system 800 is a programmable logic controller (PLC). System 800 may include memory 804, processor 806 and input/output (I/O) interface 808. Memory 804 may include non-volatile memory (e.g., flash memory, read-only memory (ROM), programmable read-only memory (PROM), erasable programmable read-only memory (EPROM), electrically erasable programmable read-only memory (EEPROM)), volatile memory (e.g., random access memory (RAM), static random access memory (SRAM), synchronous dynamic RAM (SDRAM)), or bulk storage memory (e.g., CD-ROM or DVD-ROM, hard drives). Memory 804 may include a non-transitory computer-readable storage medium (e.g., non-transitory program storage device) having program instructions 810 stored thereon. Program instructions 810 may include program modules 812 that are executable by a computer processor (e.g., processor 806) to cause the functional operations described, such as those described with regard to surface control system 130, or method 700.

Processor 806 may be any suitable processor capable of executing program instructions. Processor 806 may include a central processing unit (CPU) that carries out program instructions (e.g., the program instructions of the program modules 812) to perform the arithmetical, logical, or input/output operations described. Processor 806 may include one or more processors. I/O interface 808 may provide an interface for communication with one or more I/O devices 814, such as a joystick, a computer mouse, a keyboard, or a display screen (for example, an electronic display for displaying a graphical user interface (GUI)). I/O devices 814 may include one or more of the user input devices. I/O devices 814 may be connected to I/O interface 808 by way of a wired connection (e.g., an Industrial Ethernet connection) or a wireless connection (e.g., a Wi-Fi connection). I/O interface 808 may provide an interface for communication with one or more external devices 816. In some embodiments, I/O interface 808 includes one or both of an antenna and a transceiver. In some embodiments, external devices 816 include logging tools, lab test systems, well pressure sensors, well flowrate sensors, or other sensors described in connection with surface system 125 or PWG tool 280/680.

Further modifications and alternative embodiments of various aspects of the disclosure will be apparent to those skilled in the art in view of this description. Accordingly, this description is to be construed as illustrative only and is for the purpose of teaching those skilled in the art the general manner of carrying out the embodiments. It is to be understood that the forms of the embodiments shown and described herein are to be taken as examples of embodiments. Elements and materials may be substituted for those illustrated and described herein, parts and processes may be reversed or omitted, and certain features of the embodiments may be utilized independently, all as would be apparent to one skilled in the art after having the benefit of this description of the embodiments. Changes may be made in the elements described herein without departing from the spirit and scope of the embodiments as described in the following claims. Headings used herein are for organizational purposes only and are not meant to be used to limit the scope of the description.

It will be appreciated that the processes and methods described herein are example embodiments of processes and methods that may be employed in accordance with the techniques described herein. The processes and methods may be modified to facilitate variations of their implementation and use. The order of the processes and methods and the operations provided may be changed, and various elements may be added, reordered, combined, omitted, modified, and so forth. Portions of the processes and methods may be implemented in software, hardware, or a combination of software and hardware. Some or all of the portions of the processes and methods may be implemented by one or more of the processors/modules/applications described here.

As used throughout this application, the word "may" is used in a permissive sense (i.e., meaning having the potential to), rather than the mandatory sense (i.e., meaning must). The words "include," "including," and "includes" mean including, but not limited to. As used throughout this application, the singular forms "a", "an," and "the" include plural referents unless the content clearly indicates otherwise. Thus, for example, reference to "an element" may include a combination of two or more elements. As used throughout this application, the term "or" is used in an inclusive sense, unless indicated otherwise. That is, a description of an element including A or B may refer to the element including one or both of A and B. As used throughout this application, the phrase "based on" does not limit the associated operation to being solely based on a particular item. Thus, for example, processing "based on" data A may include processing based at least in part on data A and based at least in part on data B, unless the content clearly indicates otherwise. As used throughout this application, the term "from" does not limit the associated operation to being directly from. Thus, for example, receiving an item "from" an entity may include receiving an item directly from the entity or indirectly from the entity (e.g., by way of an intermediary entity). Unless specifically stated otherwise, as apparent from the discussion, it is appreciated that throughout this specification discussions utilizing terms such as "processing," "computing," "calculating," "determining," or the like refer to actions or processes of a specific apparatus, such as a special purpose computer or a similar special purpose electronic processing/computing device. In the context of this specification, a special purpose computer or a similar special purpose electronic processing/computing device is capable of manipulating or transforming signals, typically represented as physical, electronic or magnetic quantities within memories, registers, or other information storage devices, transmission devices, or display devices of the special purpose computer or similar special purpose electronic processing/computing device.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations may be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). The use of the term "about" (or its variants) means ±10% of the subsequent number, unless otherwise stated.

Use of the term "optionally" with respect to any element of a claim means that the element is required, or alternatively, the element is not required, both alternatives being within the scope of the claim. Use of broader terms such as comprises, includes, and having may be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise.

Many other embodiments will be apparent to those of skill in the art upon reviewing the above description. The scope of the subject matter of the present disclosure therefore should be determined with reference to the appended claims, along with the full scope of equivalents to which such claims are entitled. In the appended claims, the terms "including" and "in which" are used as the plain-English equivalents of the respective terms "comprising" and "wherein."

What is claimed is:

1. A system for looking ahead of a drill bit, comprising: a plane wave generator (PWG) tool configured for being deployed downhole inside a wellbore for formation evaluation and generation of reflection data; a power source configured to provide electric power to the PWG tool for the formation evaluation and the generation of the reflection data; a surface control system configured to receive the reflection data from the PWG tool and generate image data of a subsurface rock formation based on the received reflection data; and a wireline that electrically couples the PWG tool to the power source and that communicatively couples the PWG tool to the surface control system; wherein the PWG tool includes a beam forming network (BFN) architecture and a plurality of antenna elements mounted to a base of the PWG tool and configured to transmit and receive electromagnetic signals, the base of the PWG tool is a cylindrical base and a space between the plurality of antenna elements on the base is filled with microwave absorbent material; the plurality of antenna elements are mounted on the cylindrical base as a circular array of a plurality of concentric rings of antenna elements, each of the plurality of concentric rings including at least one of the plurality of antenna elements, and the BFN architecture is configured to individually control relative amplitude and phase weights between the plurality of concentric rings of antenna elements, while exciting each antenna element within the same concentric ring with the same amplitude and phase.

2. The system according to claim 1, wherein the microwave absorbent material of the cylindrical base is a high strength temperature resistant material including at least one of a ceramic material and a carbon based material, wherein the cylindrical base with the plurality of antenna elements mounted thereon is adapted to face a bottomhole surface of the wellbore.

3. The system according to claim 1, wherein the PWG tool is configured to transmit the electromagnetic signals from the plurality of antenna elements in response to the electric power received from the power source such that the transmitted electromagnetic signals: (i) are synthesized into plane waves in a quiet zone having a finite volume and being in close proximity to the plurality of antenna elements, and (ii) penetrate the subsurface rock formation beyond a bottomhole surface of the wellbore as the plane waves.

4. The system according to claim 3, wherein the plurality of antenna elements of the PWG tool are configured to act as a reflectometer, alternating between transmitting and receiving modes to:
   transmit the electromagnetic signals that are synthesize into the plane waves and penetrate the subsurface rock formation beyond the bottomhole surface of the wellbore as the plane waves, and
   receive reflections of the transmitted plane waves from the subsurface rock formation in the quiet zone to capture reflection coefficients in frequency or time domain of different media of the subsurface rock formation in the quiet zone.

5. The system according to claim 4, wherein the PWG tool is further configured to generate reflection data based on the received reflections of the transmitted plane waves, and transmit the reflection data to the surface control system via the wireline, and wherein the reflection data indicates a contrast in electromagnetic properties at an interface between two different media of the subsurface rock formation in the quiet zone.

6. The system according to claim 1, wherein each of the plurality of antenna elements is an aperture antenna filled with dielectric material that is adapted to resist high temperature and pressure of a downhole wellbore environment.

7. The system according to claim 1, wherein the power source provides electric power to the PWG tool in a range of 1 kW-60 kW.

8. The system according to claim 1, wherein the PWG tool further includes a separator coupled to and disposed on a bottom surface thereof so as to establish a known separation distance between the bottom surface of the PWG tool and a bottomhole surface of the wellbore.

9. The system according to claim 8, wherein the separator includes microwave absorbent material disposed on an inside thereof, and wherein the power source and the surface control system are disposed at a well surface proximal to an uphole end of the wellbore.

10. A plane wave generator (PWG) tool for looking ahead of a drill bit, comprising
a casing that is adapted to be suspended downhole inside a wellbore from an uphole side of the casing by a wireline configured to supply electric power to the PWG tool and to transmit reflection data generated by the PWG tool to a surface control system;
a PWG system housed in the casing, wherein the PWG system includes a beam forming network (BFN) architecture and a plurality of antenna elements mounted to a base of the PWG system so that the plurality of antenna elements mounted to the base are exposed on a downhole side of the casing that is opposite to the uphole side,
wherein the base is a cylindrical base and a space between the plurality of antenna elements on the base is filled with microwave absorbent material,
wherein the plurality of antenna elements are mounted to the cylindrical base as a circular array of a plurality of concentric rings of antenna elements, each of the plurality of concentric rings including at least one of the plurality of antenna elements, and
wherein the BFN architecture is configured to individually control relative amplitude and phase weights between the plurality of concentric rings of antenna elements, while exciting each antenna element within the same concentric ring with the same amplitude and phase.

11. The PWG tool according to claim 10, wherein the BFN architecture includes a combination of passive and digital BFNs, and wherein the plurality of concentric rings of antenna elements includes at least three concentric rings of antenna elements.

12. The PWG tool according to claim 10, wherein the microwave absorbent material of the cylindrical base is a high strength temperature resistant material including at least one of a ceramic material and a carbon based material.

13. The PWG tool according to claim 10, wherein the PWG tool is configured to transmit electromagnetic signals from the plurality of antenna elements in response to the electric power supplied to the PWG tool such that the transmitted electromagnetic signals: (i) are synthesized into plane waves in a quiet zone having a finite volume and being in close proximity to the plurality of antenna elements, and (ii) penetrate the subsurface rock formation beyond a bottomhole surface of the wellbore as the plane waves.

14. The PWG tool according to claim 13, wherein the plurality of antenna elements of the PWG tool are configured to act as a reflectometer alternating between transmitting and receiving modes to:
transmit the electromagnetic signals that are synthesize into the plane waves and penetrate the subsurface rock formation beyond the bottomhole surface of the wellbore as the plane waves, and
receive reflections of the transmitted plane waves from the subsurface rock formation in the quiet zone to capture reflection coefficients in frequency or time domain of different media of the subsurface rock formation in the quiet zone.

15. The PWG tool according to claim 14, wherein the PWG tool is further configured to generate reflection data based on the received reflections of the transmitted plane waves, and transmit the reflection data to the surface control system via the wireline, and wherein the reflection data indicates a contrast in electromagnetic properties at an interface between two different media of the subsurface rock formation in the quiet zone.

16. The PWG tool according to claim 10, wherein each of the plurality of antenna elements is an aperture antenna filled with dielectric material that resists high temperature and pressure of a downhole wellbore environment.

17. The PWG tool according to claim 10, further comprising a separator coupled to the casing on the downhole side so as to establish a known separation distance between the plurality of antenna elements on the downhole side of the casing and a bottomhole surface of the wellbore, wherein the separator includes microwave absorbent material disposed on an inside thereof.

18. A method for looking ahead of a drill bit, comprising:
pulling a drill bit and a drill string out of a borehole in response to determining a need to look ahead of the drill bit during a drilling operation;
lowering a wireline based plane wave generator (PWG) tool downhole into the borehole such that a bottom surface of the PWG tool is positioned at a predetermined height above a bottomhole surface of the borehole, wherein the PWG tool includes a plurality of antenna elements that are mounted to the bottom surface of the PWG tool and that are configured to transmit and receive electromagnetic signals;
transmitting electric power from a surface based power source to the plurality of antenna elements of the PWG tool via the wireline;
emitting electromagnetic signals from the plurality of radiating elements in response to the transmitted electric power such that the emitted electromagnetic signals: (i) are synthesized into plane waves in a quiet zone having a finite volume and being in close proximity to the plurality of antenna elements, and (ii) penetrate a subsurface rock formation beyond the bottomhole surface of the borehole as the plane waves;
receiving, with the plurality of antenna elements and in response to the emitted electromagnetic signals, reflections of the transmitted plane waves from the subsurface rock formation in the quiet zone to capture reflection coefficients in frequency or time domain of different media of the subsurface rock formation in the quiet zone;
generating reflection data based on the received reflections of the transmitted plane waves, wherein the reflection data indicates a contrast in electromagnetic properties at an interface between two different media of the subsurface rock formation in the quiet zone;

transmitting the reflection data to the surface control system via the wireline; and processing, at the surface control system, the reflection data for permittivity prediction and generation of image data, wherein a lost circulation zone in the quiet zone is detected based on the generated image data.

19. The method according to claim 18, wherein the need to look ahead of the drill bit is determined in response to detecting that an amount of drilling fluid lost downhole during the drilling operation is more than a predetermined threshold amount.

20. The method according to claim 18, wherein the predetermined height is set based on a wavelength of the electromagnetic signals transmitted by the plurality of antenna elements of the PWG tool and synthesized into the plane waves.

21. The method according to claim 20, wherein the predetermined height is set to be approximately 7-10 times the wavelength of the electromagnetic signals in air.

* * * * *